United States Patent [19]

Tadokoro et al.

[11] Patent Number: 4,627,395

[45] Date of Patent: Dec. 9, 1986

[54] INTAKE SYSTEM FOR ROTARY PISTON ENGINES

[75] Inventors: Tomoo Tadokoro; Haruo Okimoto; Ikuo Matsuda, all of Hiroshima, Japan

[73] Assignee: Madza Motor Corporation, Hiroshima, Japan

[21] Appl. No.: 724,313

[22] Filed: Apr. 17, 1985

[30] Foreign Application Priority Data

Apr. 19, 1984 [JP] Japan .................................. 59-79547
May 23, 1984 [JP] Japan ................................. 59-104993
May 24, 1984 [JP] Japan ................................. 59-106255

[51] Int. Cl.$^4$ ............................................. F02B 53/04
[52] U.S. Cl. ................................. 123/216; 123/52 MB; 123/242
[58] Field of Search .............. 123/216, 242, 52 MB, 123/52 M

[56] References Cited

U.S. PATENT DOCUMENTS

| 3,370,575 | 2/1968 | Soubis . | |
|---|---|---|---|
| 3,476,092 | 11/1969 | Yamamoto | 123/216 |
| 3,491,733 | 1/1970 | Soubis . | |
| 3,796,048 | 3/1974 | Annus et al. . | |
| 4,020,800 | 5/1977 | Ishikawa . | |
| 4,259,840 | 4/1981 | Tenney . | |
| 4,388,907 | 6/1983 | Sugo et al. . | |
| 4,423,711 | 1/1984 | Tadokoro et al. . | |
| 4,425,883 | 1/1984 | Tadokoro et al. . | |
| 4,566,412 | 1/1986 | Tadokoro | 123/216 |

FOREIGN PATENT DOCUMENTS 53-24909   8/1978   Japan .
59-79041   5/1984   Japan .
59-79042   5/1984   Japan .
59-79043   5/1984   Japan .
59-79044   5/1984   Japan .

OTHER PUBLICATIONS

Okimoto et al, "Improvement of Rotary Engine Performance by New Induction System" SAE Paper 83101, 6/6–9/83.

Primary Examiner—Douglas Hart
Attorney, Agent, or Firm—Fleit, Jacobson, Cohn & Price

[57] ABSTRACT

A two rotor type rotary piston engine includes an intake system comprised of including individual intake ports provided in at least one of the intermediate and side housings to open to the respective rotor cavities and adapted to be cyclically closed by the rotors as the rotors rotate, an intake passage including individual passages leading respectively to the intake ports and opened to a surge tank through openings which are opposed to each other with a spacing therebetween. The overall length of the individual passages and the spacing between the openings is determined with respect to the intake port timings so that a compression wave produced in one individual passage in opening timing of one intake port is transmitted to the other intake port just before the other intake port is closed to obtain an additional charge under a specific engine speed range.

10 Claims, 7 Drawing Figures

INTAKE SYSTEM FOR ROTARY PISTON ENGINES

BACKGROUND OF THE INVENTION

1. Field of the Invention

The present invention relates to rotary piston engines, and more particularly to intake systems for rotary piston engines. More specifically, the present invention pertains to side port type intake systems for two-rotor rotary piston engines.

2. Description of Prior Art

In general, a rotary piston engine includes a casing comprised of a rotor housing having an inner wall of trochoidal configuration, and a pair of side housings secured to the opposite sides of the rotor housing to define a rotor cavity in the rotor housings. A rotor of substantially polygonal configuration is disposed in the rotor cavities and has flanks which define, with the inner wall of the rotor housing, working chambers having volumes which are cyclically changed as the rotor rotates. The casing is generally formed with an exhaust and intake ports so that intake, compression, combustion, expansion and exhaust cycles are conducted sequentially in each of the working chambers.

In this type of rotary piston engines, it has been proposed to utilize pulsations in the intake passage so that effective feed of intake gas can be accomplished throughout a wide range of the engine operating speed. For example, the U.S. Pat. No. 3,491,733 issued on Jan. 27, 1970 to Soubis et al. teaches to separate the intake passage into two passages of different lengths and connect these separated passages to two separated intake ports having different port closing timings so that the two passages and the two intake ports are used under a high speed engine operation whereas only one passage and only one intake port having earlier port closing timing are used under a low speed engine operation. With this arrangement, it is possible to feed the intake charge with resonance under a wide engine operating speed.

It should however be noted that the U.S. patent relates to a single rotor type rotary piston engine and there is no precise teaching as to how the pulsations in the passages are utilized. Further, the U.S. patent discloses a so-called peripheral port type rotary piston engine having the intake ports provided in the rotor housing. This type of engine is considered disadvantageous in that the intake ports are overlapped with the exhaust port so that the exhaust gas is blown under its own pressure into the intake working chamber decreasing the intake gas charge. In engines of recent years, there is a tendency that the exhaust gas pressure is increased due to facilities for suppressing engine noise and for purifying engine exhaust gas. In engines having turbo-superchargers, the exhaust gas pressure is further increased. Therefore, the peripheral port type intake system is not satisfactory to increase the intake charge utilizing the resonance effect.

In view of the foregoing problems, the inventors have proposed by the application Ser. No. 542,584 filed on Oct. 17, 1983 an intake system for two-rotor type rotary piston engines in which pulsations in intake passages can effectively be utilized to increase the intake gas charge. The proposal is based on the findings that a compression wave is produced in the vicinity of the intake port when the port is opened under the influence of the pressure of the residual combustion gas and that there is a tendency in recent engines that the compression wave is intensified due to the increase in the exhaust gas pressure. According to the proposal, the arrangement is such that in two rotor rotary piston engines, the compression wave produced in one intake passage leading to one rotor cavity when the intake port for the same rotor cavity is opened is transmitted through the other intake passage leading to the other rotor cavity to the intake port of the said other rotor cavity just before the latter mentioned intake port is closed under a specific engine speed.

The proposed arrangement is considered to be effective in providing an increased intake charge under the specific engine speed. It should however be noted that, when the intake system is applied to fuel injection type engines having airflowmeters and fuel injection valves for supplying metered amount of fuel in accordance with the airflow signals from the airflowmeters, it is required to provide surge tanks in the intake passages in order to avoid undesirable changes in the air-fuel ratio during transient periods of engine operations. Such surge tanks in the intake passages have been found as having effects of absorbing pressure pulsations in the intake passages so that the supercharging effects of the proposed arrangements are decreased.

OBJECT OF THE INVENTION

It is therefore an object of the present invention to provide an intake system for a two rotor rotary piston engine in which pressure pulsations in the intake passages can be effectively utilized for increasing the engine intake charges.

Another object of the present invention is to provide an intake system for a two rotor rotary piston engine, in which a compression wave produced in the intake port for one rotor casing due to the pressure of residual gas when the intake port is opened can be effectively transmitted to the intake port for the other rotor casing to provide a supercharging effect.

SUMMARY OF THE INVENTION

According to the present invention, there is therefore provided a two rotor type rotary piston engine including a casing comprised of a pair of rotor housings each having an inner wall of trochoidal configuration, an intermediate housing located between the rotor housings and a pair of side housings secured to outer sides of the respective rotor housings to define rotor cavities in the respective rotor housings, a pair of substantially polygonal rotors disposed in the respective rotor cavities with apex portions in sliding engagement with the inner walls of the respective rotor housings to define working chambers of cyclically variable volumes, said rotors being carried by eccentric shaft means so that said rotors are rotated with 180° phase difference in terms of angle of rotation of said eccentric shaft means, intake means including individual intake port means provided in at least one of said intermediate and side housings to open to the respective rotor cavities and adapted to be cyclically closed by said rotors as the rotor rotates, intake passage means including common air chamber means and individual passage means having one ends leading respectively to said intake port means and the other ends opened to said air chamber means through openings which are opposed to each other in said air chamber means with a spacing therebetween said intake port means having opening period which is determined in relation to overall length of said individual passage means and said spacing between said openings so that a compression wave produced in one individual passage means in opening timing of one intake port means is transmitted to the other intake port means just before said other intake port means is closed to obtain an additional charge under a specific engine speed range.

In a preferable aspect of the present invention, the intake port means may be provided in both side housings as well as in the intermediate housing. The intake port means formed in the intermediate housing and leading to the respective rotor cavities may be connected respectively with individual intake passage means which are communicated with each other by air chamber means and, similarly, the intake port means formed in the side housings may be connected respectively with further individual intake passage means which are connected with each other by further air chamber means. In such an arrangement, one of the sets of the intake passage means leading to either the intake port means in the intermediate housing or the intake port means in the side housings may have the aforementioned overal length with the individual passage means being opposed each other in the air chamber means and this particular set of passage means may be substantially closed under a light load engine operation.

According to the features of the present invention, the individual passage means are opposed to each other at the openings to the common air chamber means so that the compression wave produced at one intake port means due to the pressure of residual combustion gas when the intake port means is opened is transmitted through the individual intake passage means to the other intake port means without any noticeable absorption at the air chamber means. It is therefore possible to obtain a supercharging effect.

The above and other objects and features of the present invention will become apparent from the following descriptions of preferred embodiments taking reference to the accompanying drawings.

Figure 1:
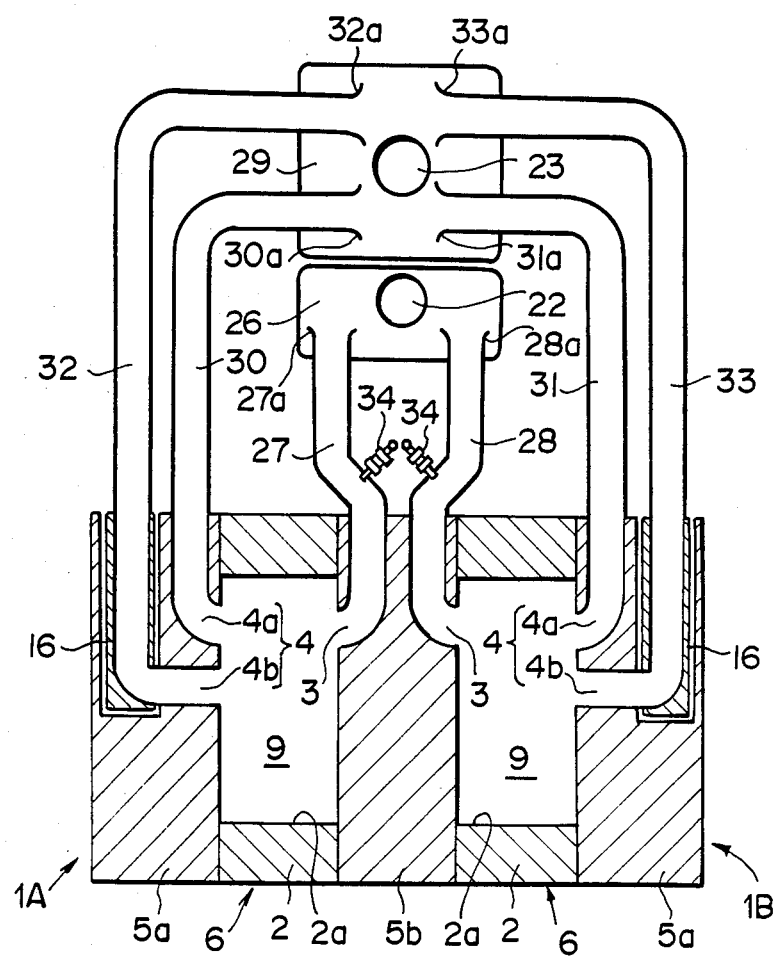
FIG. 1 is a diagrammatical illustration of the intake system of a two rotor rotary piston engine in accordance with one embodiment of the present invention.
Figure 2:
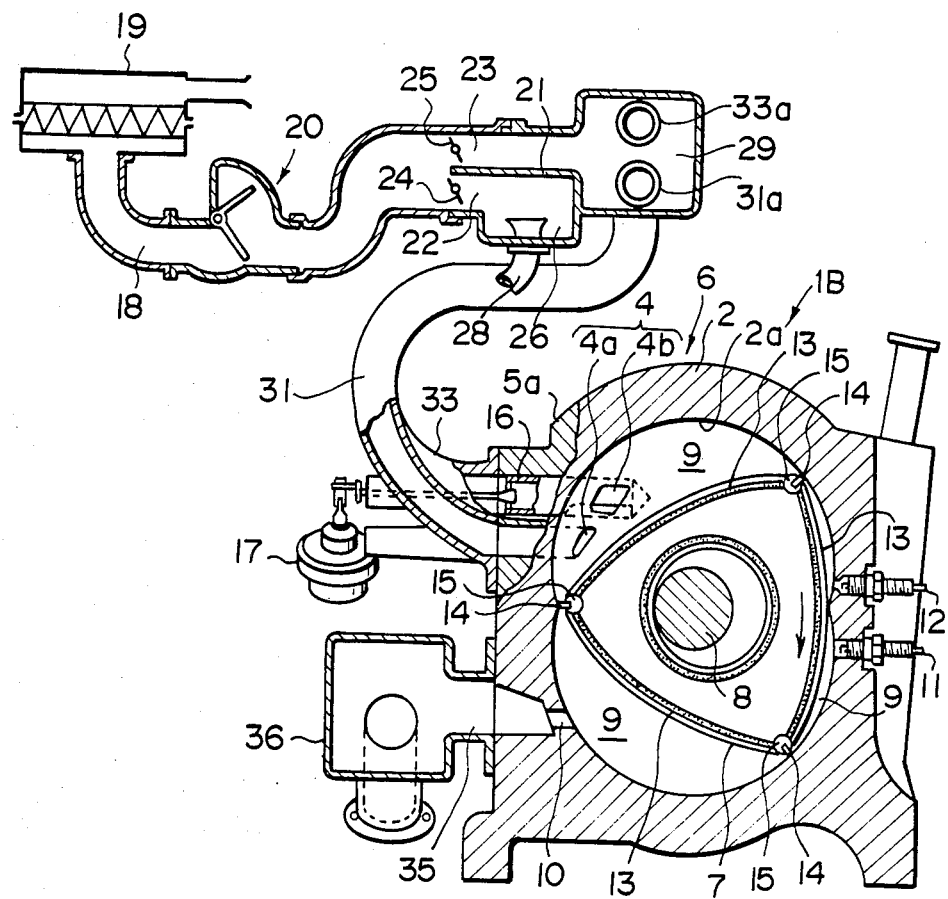
FIG. 2 is a sectional view of a rotary piston engine having the intake system shown in FIG. 1.

Referring to the drawings, particularly to FIGS. 1 and 2, there is shown a two-rotor type rotary piston engine comprised of a pair of engine sections 1A and 1B. The engine sections 1A and 1B respectively have rotor housings 2 which are formed with inner walls 2a of trochoidal configuration. An intermediate housing 5b is located between the rotor housings 2 to separate them one from the other as shown in FIG. 1. The outer sides of the rotor housings 2 are attached with side housings 5a which are formed with intake ports 4a and 4b generally designated by a reference numeral 4. Thus, the rotor housings 2, the side housings 5a and the intermediate housing 5b constitute a casing 6 in which a pair of rotor cavities are defined. The intermediate housing 5b is formed with intake ports 3, one for each rotor cavity.

In each of the rotor cavities, there is disposed a rotor 7 of substantially triangular configuration. The rotors 7 are carried by an eccentric shaft 8 and have apex portions provided with apex seals 14 and corner seals 15. Further, the rotors 7 are provided at their side surfaces with side seals 13. The rotors 7 are rotatable with their apex seals 14 in sliding contact with the inner walls 2a of the rotor housings 2. The side seals 13 are maintained in sliding contact with the surfaces of the side housings 5a and the intermediate housing 5b. Thus, in each of the rotor cavities in the casing 6, there are defined working chambers 9 of which volumes cyclically change as the rotor 7 rotates. The eccentric shaft 8 carries the rotors 7 with 180° phase difference between the rotors 7. The rotor housings 2 are formed with exhaust ports 10 and provided with ignition plugs 11 and 12.

The intake system of the engine includes an air cleaner 19 connected with a common intake passage 18 provided with an air-flow detector 20. The common intake passage 18 is separate at its downstream portion by a partition wall 21 into a primary passage 22 and a secondary passage 23 which are respectively provided with throttle valves 24 and 25. The primary passage 22 leads to a surge tank 26 which is in turn connected with a pair of individual intake passages 27 and 28 leading respectively to the intake ports 3 opening to the respective rotor cavities. In the vicinity of each intake port 3, there is provided a fuel injecting nozzle 34.

The secondary passage 23 is connected with a second surge tank 29 which is in turn connected with individual passages 30, 31, 32 and 33. The passages 30 and 31 respectively lead to the intake ports 4a for the respective rotor cavities, whereas the passages 32 and 33 respectively lead to the intake ports 4b for the respective rotor cavities. As well known in the art, the throttle valve 25 in the secondary passage 23 starts to open when the throttle valve 24 in the primary passage 22 is opened beyond a predetermined extent. Thus, the intake air is drawn substantially through the primary passage 22 and the individual passages 27 and 28 to the intake ports 3 under a light load operation. The intake ports 3 may therefore be referred as light-load intake ports.

Each of the intake ports 4b is provided with a rotary valve 16 which is actuated by an actuator 17. The actuator 17 is responsive to the engine exhaust gas pressure and functions to move the rotary valve 16 to an open position when the exhaust gas pressure exceeds a predetermined value. Since the exhaust gas pressure increases in response to an increase in the engine speed, it should be understood that the rotary valve 16 opens the intake ports 4b under a high speed range. It is preferable that the intake ports 4b and the passages 32 and 33 have effective areas larger than other ports and passages so as to provide a sufficient amount of intake air charge.

In FIG. 1, it will be noted that the individual passages 27 and 28 leading to the light load intake ports 3 extend into the surge tank 26 and open to the tank 26 through flared openings 27a and 28a. The individual passages 30, 31, 32 and 33 extend into the surge tank 29 and open to the tank 29 through flared openings 30a, 31a, 32a and 33a, respectively. As shown in FIG. 1, the openings 30a and 31a of the individual passage 30 and 31 leading to the intake ports 4a one opposed to each other in the surge tank 29 with a spacing for the reasons which will be described later. Similarly, the openings 32a and 33a of the individual passages 32 and 33 leading to the intake ports 4b are opposed to each other in the surge tank 29 with a spacing.

As well known in the art, the intake ports 3, 4a and 4b are cyclically opened to the working chambers 9 as the rotors 7 rotate. The timings of the intake ports are determined by the locations of the ports in the casing.

The lengths of the individual passages 30 and 31 and the spacing between the openings 30a and 31a define an overall length of the passage between the corresponding intake ports 4a. The overall length is determined in relation to the timings of the intake ports 4a so that a compression wave produced at one of the intake ports 4a when the same port is opened in transmitted to the other intake port 4a just before the latter mentioned intake port 4a is closed under a specific engine speed range, preferably under a speed range between 3000 and 7000 rpm. Similarly, the overall length of the individual passages 32 and 33 and the spacing between the openings 32a and 33a is determined in relation to the timings of the intake ports 4b so that a compression wave produced at one intake port 4b is transmitted to the other intake port 4b just before the latter mentioned intake port 4b is closed in the aforementioned speed range.

Figure 3:
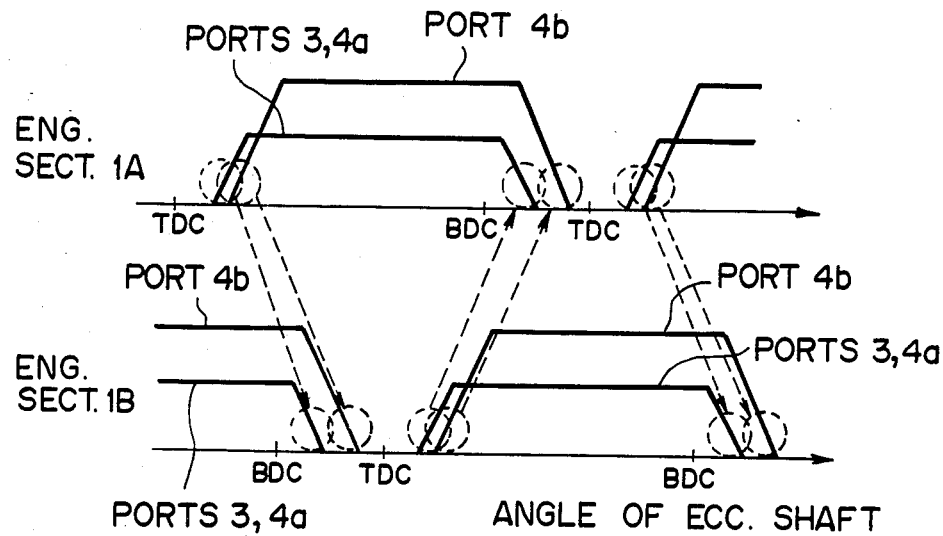
FIG. 3 is a diagram showing the intake port timings.

In an engine operation under a relatively heavy load, the throttle valve 25 in the secondary passage 23 opens so that the intake air is drawn through the secondary passage 23 as well as through the primary passage 22. As the engine speed increases, the valves 16 are also opened so that the intake air is drawn to the working chambers 9 through all intake ports 3, 4a and 4b. Referring to FIG. 3, it will be noted that the intake ports 3 and 4a have the same port timings whereas the intake port 4b has the port closing timing which is later than the port closing timing of the intake ports 3 and 4a. It will therefore be understood that, under a high speed, heavy load operation, the intake port opening period can in effect be increased. The opening timing of the port 4b may be the same as that of the ports 3 and 4a, however, for the purpose of clarity, the opening timing of the port 4b is shown as being slightly retarded than that of the ports 3 and 4a.

When the intake ports 3, 4a and 4b are opened to commence the intake stroke, a compression wave is produced at each intake port due to the pressure of the residual combustion gas. The compression wave is then transmitted back through the individual passage leading to each intake port. Since the overall length of the passages 30 and 31 and the spacing between the openings 30a and 31a is determined as described previously, the compression wave produced at one intake port 4a is transmitted through these passages to the other intake port 4a just before the other intake port 4a is closed as shown by arrows in FIG. 3. Similarly, the compression wave produced at one intake port 4b is transmitted through the passages 32 and 33 to the other intake port 4b just before the other intake port 4b is closed. The compression waves thus transmitted to the other intake ports serve to increase the intake charge by preventing flow back of the intake air at the end of the intake stroke.

It should be noted that the openings 30a and 31a are opposed to each other in the surge tank 29 so that it is possible to transmit the compression wave from one of the passages 30 and 31 to the other without any noticeable attenuation.

For the same reason, it is also possible to transmit the compression wave through the individual passages 32 and 33 without any noticeable attenuation. Thus, a high supercharging effect can be accomplished.

Figure 6:
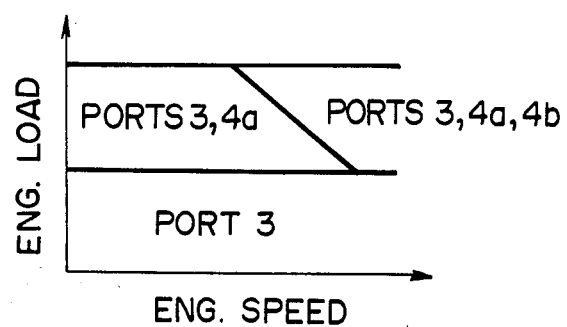
FIG. 6 is a diagram showing the operations of the intake ports in relation to the engine load and the engine speed; and, FIG. 7 shows a modification of the intake system shown in FIG. 4.

When the engine speed decreases in a heavy load engine operation, the rotary valves 16 close the intake ports 4b so that the intake air in drawn into the working chambers 9 only through the intake ports 3 and 4a. Under a light load operation, the secondary passage 23 is closed by the throttle valve 25 so that the intake air is passed only through the intake ports 3. These operations are diagrammatically shown in FIG. 6.

Figure 4:
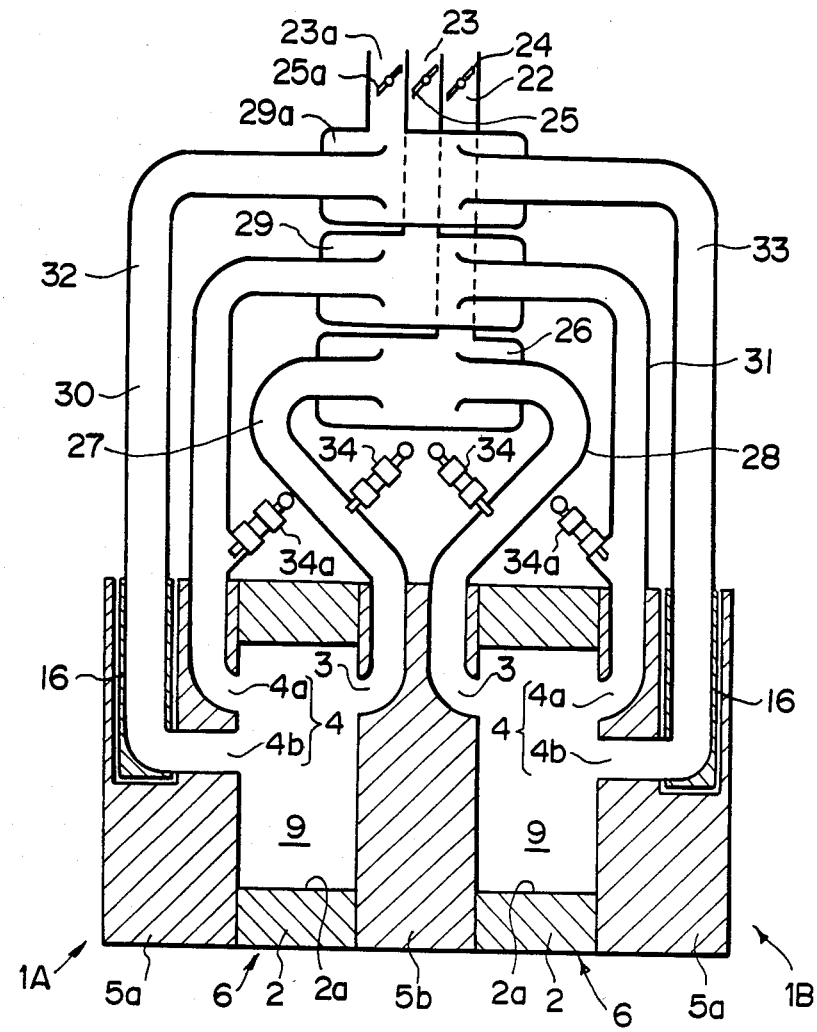
FIG. 4 is a diagrammatical illustration similar to FIG. 1 but showing another embodiment.
Figure 5:
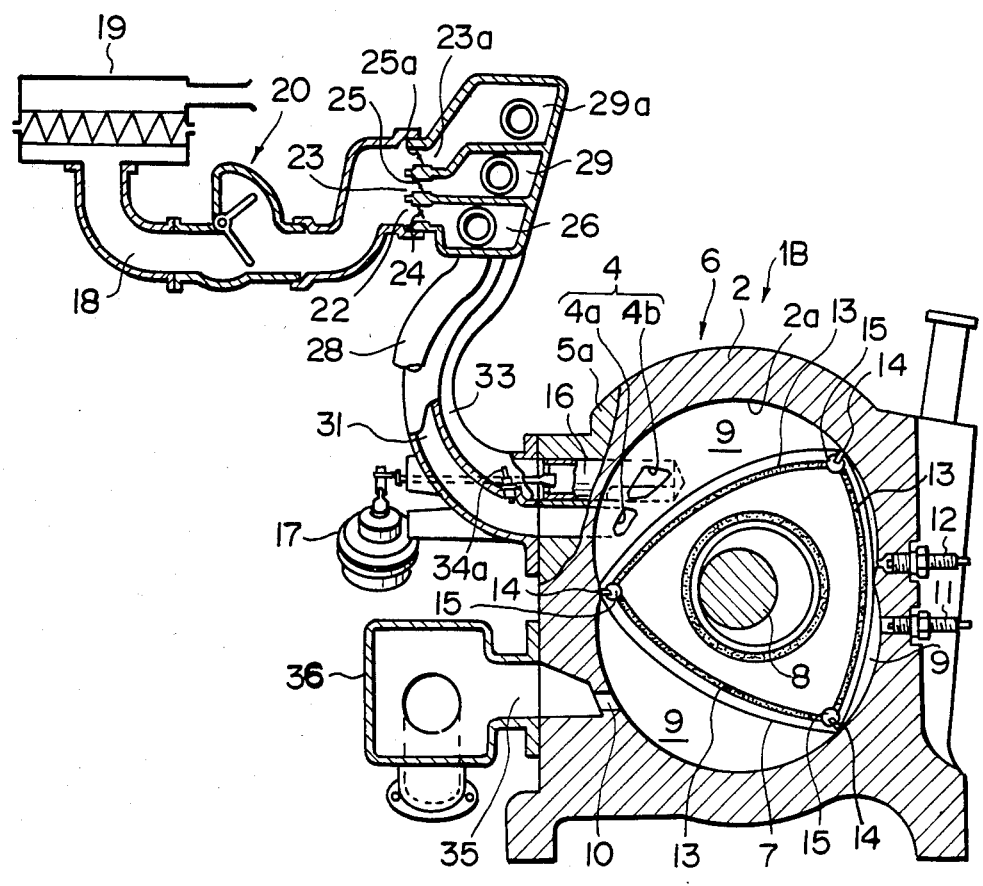
FIG. 5 is a sectional view of a rotary piston engine having the intake system shown in FIG. 4.

Referring now to FIGS. 4 and 5, the embodiment shown therein is different from the previously described embodiment in that the common intake passage 18 is divided into three passages 22, 23 and 23a which respectively lead to surge tanks 26, 29 and 29a. The passages 22, 23 and 23a are respectively provided throttle valves 24, 25 and 25a. The individual passages 27 and 28 leading to the intake ports 3 are opened to the surge tank 26 with openings opposed to each other. The individual passages 30 and 31 leading to the intake ports 4a are opened to the surge tank 29 through openings which are opposed to each other. The individual passages 32 and 33 leading to the intake ports 4b are opened to the surge tank 29a through openings which are opposed to each other. The lengths of the individual passages and the spacings between the openings in the respective tanks are determined as in the case of the passages 30 and 31 and the spacing between the openings 30a and 31a or the passages 32 and 33 and the spacing between the openings 32a and 33a so that a supercharging effect is accomplished by transmitting the compression wave. Further, the individual passages 30 and 31 are provided with second fuel injection valves 34a in the vicinity of the intake ports 4a. In other respects, the structures are substantially the same as in the previous embodiment.

Figure 7:
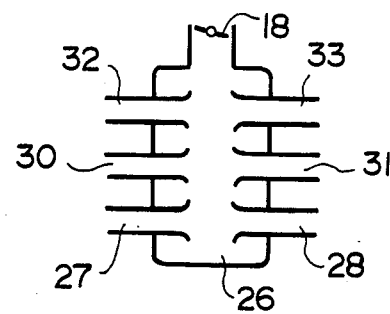

FIG. 7 shows a further embodiment in which the common intake passage 18 is connected with a common surge tank 26 to which the individual passages 27, 28, 30, 31 32 and 33 are opened. As in the previous embodiment the openings of the passages 27 and 28 are opposed to each other. The openings of the passages 30 and 31 are oppposed to each other and the openings of the passages 32 and 33 are opposed to each other.

The invention has thus been shown and described with reference to specific embodiments, however, it should be noted that the invention is in no way limited to the details of the illustrated structures but changes and modifications may be made without departing from the scope of the appended claims.

What is claimed is:

1. A two rotor type rotary piston engine including a casing comprised of a pair of rotor housings each having an inner wall of trochoidal configuration, an intermediate housing located between the rotor housings and a pair of side housings secured to outer sides of the respective rotor housings to define rotor cavities in the respective rotor housings, a pair of substantially polygonal rotors disposed in the respective rotor cavities with apex portions in sliding engagement with the inner walls of the respective rotor housings to define working chambers of cyclically variable volumes, said rotors being carried by eccentric shaft means so that said rotors are rotated with 180° phase difference in terms of angle of rotation of said eccentric shaft means, intake means including individual intake port means provided in at least one of said intermediate and side housings to open to the respective rotor cavities and adapted to be cyclically closed by said rotors as the rotor rotates, intake passage means including common air chamber means and individual passage means having one set of ends leading respectively to said intake port means and the other ends opened to said air chamber means through openings which are opposed to each other in said air chamber means with a spacing therebetween, said intake port means having opening period which is related to overall length of said individual passage means and said spacing between said openings so that a compression wave produced in one individual passage means in opening timing of one intake port means is transmitted to the other intake port means just before said other intake port means is closed to obtain an additional charge within a specific engine speed range.

2. A rotary piston engine in accordance with claim 1 in which said intake port means includes first and second intake ports for each rotor cavity, the first intake ports for the respective cavities being operative in a first engine operating region, the second intake ports for the respective cavities being operative at least in a second engine operating region which is different from the first engine operating region, the individual passage means leading to at least one of said first and second intake ports having said overall length.

3. A rotary piston engine in accordance with claim 1 in which said intake port means includes first and second intake ports for each rotor cavity, the first intake ports for the respective cavities being operative in a first engine operating region, the second intake ports for the respective cavities being operative at least in a second engine operating region which is different from the first engine operating region, the individual passage means leading to said first intake ports having said overall length.

4. A rotary piston engine in accordance with claim 3 in which said first engine operating range is a heavy load range.

5. A rotary piston engine in accordance with claim 4 in which said first intake ports for the respective rotor cavities include high speed ports which are operated under a high speed range and low speed ports which are operated at least under a low speed range, said high speed ports and said low speed ports being connected to the individual passage means which are separated with each other and connected with said air chamber means.

6. A rotary piston engine in accordance with claim 4 in which said first intake ports for the respective rotor cavities include high speed ports which have valve means adapted to be opened under a high speed range and low speed ports which are operated at least under a low speed range, said high speed ports and said low speed ports being connected to the individual passage means which are separated with each other and connected with said air chamber means.

7. A rotary piston engine in accordance with claim 5 in which said high speed ports have effective areas greater than effective areas of the other intake ports.

8. A rotary piston engine in accordance with claim 1 in which said individual passage means project into the air chamber means.

9. A rotary piston engine in accordance with claim 1 in which said opening of each individual passage means in flared outward toward the opposing opening.

10. A rotary piston engine in accordance with claim 5 in which said second engine operating range is a light load range, the individual passage means leading to said second intake ports being opened to second air chamber means which is separated from the first mentioned air chamber means.

* * * * *